United States Patent
Bastide et al.

(10) Patent No.: US 9,189,539 B2
(45) Date of Patent: Nov. 17, 2015

(54) ELECTRONIC CONTENT CURATING MECHANISMS

(71) Applicant: International Business Machines Corporation, Armonk, NY (US)

(72) Inventors: Paul R. Bastide, Boxford, MA (US); Matthew E. Broomhall, Burlington, VT (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 13/836,027

(22) Filed: Mar. 15, 2013

(65) Prior Publication Data

US 2014/0280371 A1 Sep. 18, 2014

(51) Int. Cl.
*G06F 17/30* (2006.01)

(52) U.S. Cl.
CPC ............................. *G06F 17/30705* (2013.01)

(58) Field of Classification Search
CPC ................................................ G06F 17/30705
See application file for complete search history.

(56) References Cited

U.S. PATENT DOCUMENTS

| | | | |
|---|---|---|---|
| 6,584,456 B1 | 6/2003 | Dom et al. | |
| 7,827,123 B1 | 11/2010 | Yagnik | |
| 2003/0130994 A1 | 7/2003 | Singh et al. | |
| 2005/0038533 A1* | 2/2005 | Farrell et al. | 700/73 |
| 2005/0071311 A1* | 3/2005 | Agrawal et al. | 707/1 |
| 2006/0053171 A1 | 3/2006 | Eldridge et al. | |
| 2007/0219992 A1 | 9/2007 | Bollinger et al. | |
| 2007/0288465 A1* | 12/2007 | Aggarwal et al. | 707/10 |
| 2008/0147590 A1 | 6/2008 | Bechtel et al. | |
| 2008/0229828 A1* | 9/2008 | Buschman et al. | 73/579 |
| 2009/0012842 A1 | 1/2009 | Srinivasan et al. | |
| 2011/0082883 A1 | 4/2011 | Narayanan et al. | |
| 2011/0099184 A1 | 4/2011 | Symington | |

OTHER PUBLICATIONS

Bibex. Graph Database Use Case: Bibliographic exploration. Jan. 15, 2012. <https://web.archive.org/web/20120115192750/http://sparsity-technologies.com/blog/?p=522>.*

"Litera: CitationWare", Litera Corp., http://www.litera.com/citationware.aspx, accessed on Nov. 2, 2012, 2 pages.

(Continued)

*Primary Examiner* — Syed Hasan
(74) *Attorney, Agent, or Firm* — Francis Lammes; Stephen J. Walder, Jr.; Jeffrey S. LaBaw (57) ABSTRACT

Mechanisms for managing an electronic document collection are provided. A first electronic document is analyzed to identify a reference to a second electronic document and the second electronic document is analyzed to identify document dependencies with zero or more other electronic documents. A dependency information data structure is generated based on the analysis. The dependency information data structure is analyzed to identify a subset of the electronic document collection that is to be loaded into memory when performing an information analysis operation. An electronic document curation action recommendation is generated based on the identified subset of the electronic document collection. The electronic document curation action recommendation is then output.

21 Claims, 4 Drawing Sheets

(56) References Cited

OTHER PUBLICATIONS

IBM, "A Method to Exploit Metadata of Unstructured Information for Search and Classification", ip.com, http://www.ip.com/pubview/IPCOM000144129D, Dec. 19, 2006, 4 pages.

Lee, Ingyu et al., "Weighted Hybrid Features to Resolve Mixed Entities", 2011 Sixth International Conference on Digital Information Management, IEEE, 2011, pp. 67-72.

Rak, Rafal et al., "Argo: an integrative, interactive, text mining-based workbench supporting curation", Database, vol. 2012, Article ID bas010, doi: 10.1093/database/bas010, Jan. 13, 2012, 7 pages.

Yuan, Michael J., "Watson and healtchare", IBM Corporation, developerWorks, http://www.ibm.com/developerworks/industry/library/ind-watson/, Apr. 12, 2011, pp. 1-14.

Zhu, Jacki et al., "Metadata Management with IBM InfoSphere Information Server", IBM Corporation, www.ibm.com/redbooks/sg247939, Oct. 2011, 458 pages.

* cited by examiner

ELECTRONIC CONTENT CURATING MECHANISMS

BACKGROUND

The present application relates generally to an improved data processing apparatus and method and more specifically to mechanisms for performing electronic content curation.

Electronic storage of content as structured and unstructured electronic documents is proliferating today's computing networks and many applications have been developed to operate on such content to achieve various business purposes. Various types of applications operate on these large volumes of electronic documents or content including search engines, question and answer systems, such as Watson™ available from International Business Machines (IBM) Corporation of Armonk, N.Y., and the like. Watson™ is a supercomputer that processes structured and unstructured electronic content using natural language processing to extract information for answering questions posed to the Watson™ system. More information about the Watson™ system may be obtained for the IBM developerWorks website, such as the document "Watson and Healthcare," by Michael J. Yuan, Apr. 12, 2011.

Within a group of documents in an unstructured information management system, such as a question and answer system, massive amounts of electronic documents must be evaluated to perform the desired operation and return desired results. Ideally, it would be desirable to be able to load all of these electronic documents into memory for processing by the unstructured information management system. However, reality is that memory is limited and the volume of electronic documents that may be in the corpus of content that can be evaluated by the unstructured information management system is vastly larger than the available memory capacity.

SUMMARY

In one illustrative embodiment, a method, in a data processing system, is provided for managing an electronic document collection. The method comprises analyzing a first electronic document to identify a reference to a second electronic document and analyzing the second electronic document to identify document dependencies with zero or more other electronic documents. The method further comprises generating a dependency information data structure based on the analysis of the first electronic document and the analysis of the second electronic document. The method also comprises analyzing the dependency information data structure to identify a subset of the electronic document collection that is to be loaded into memory when performing an information analysis operation. In addition, the method comprises generating an electronic document curation action recommendation based on the identified subset of the electronic document collection. The method also comprises outputting the electronic document curation action recommendation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments described herein provide document curating mechanisms for the acquisition, de-acquisition, and management of content in an unstructured information management system having unstructured content, e.g., electronic documents, files, and the like. The illustrative embodiments determine dependencies of electronic documents, files, and the like (hereafter referred to generally and collectively as "documents"), such as, for example, document dependencies, authorship dependencies, publication dependencies, and the like. Document dependencies refer to one document referencing another document. Authorship dependencies refer to a document's author being an author or co-author of another document. Publication dependencies refers to a document being associated with a particular publication company, journal, or other publishing entity.

The illustrative embodiments map the dependency relationships and analyze the mapped documents' effects on the quality of accuracy of information returned by the unstructured information management system, such as search results returned by a search engine, answers returned by a question and answer system, e.g., Watson available from International Business Machines Corporation, or the like. The effects may be evaluated based on an analysis of the mapped dependency relationships to identify the relative importance of particular documents to the document collection, strengths of relationships between documents and documents and their authors/publications, and the like.

The "effect" of a particular document essentially measures the resulting impact on the results that would be returned by the unstructured information management system if that document were not loaded for analysis by the unstructured information management system. The effect of a document may be evaluated relative to pre-established or dynamically determined thresholds, e.g., numbers of links with other referenced documents or documents that reference the current document, numbers of documents authored by a particular author, and other threshold values which may give indications of "hot spots" within the document collection or relative importance of documents/authors within the document collection. The unstructured information management systems that operate on such documents and may make use of the mechanisms of the illustrative embodiments are hereafter referred to generally and collectively as "information systems."

The illustrative embodiments may further recommend curation actions for the document and the information system. The term "curation" as used herein refers to digital curation of electronic documents, which is the process of establishing and developing repositories of digital assets for current and future reference. Digital curation involves the selection, preservation, maintenance, collection, and archiving of digital assets, e.g., electronic documents and the like. In the context of the curation operations performed by the illustrative embodiments, the primary curation operations implemented by the mechanisms of the illustrative embodiments are to determine which electronic documents to maintain in a collection of loaded documents and which electronic documents may be removed from the collection of loaded documents, and performing operations to load or unload such electronic documents from the collection of loaded documents as a result of such determinations.

For example, the illustrative embodiments may operate to recommend the addition and/or removal of documents from a set of documents to be loaded for evaluation by the information system, either the document that is the subject of the analysis or other documents that are related to the document that is the subject of the analysis, e.g., if the document in question is determined to be a better document for the purposes of the information system than another document in the document collection, a recommendation may be made to remove the other document from the set of loaded documents. The information system may either automatically, or at the request of a human administrator, perform curation operations to implement the recommendations made by the mechanisms of the illustrative embodiments.

Within the context of this description, the term "loaded" document refers to a document that is loaded into memory for use by an information system, such as for analysis by the information system for purposes of generating a result. Documents may be loaded or unloaded. An unloaded document is one that is part of the document collection and may be stored in a more permanent storage system, such as storage system comprising one or more hard disk drives, magnetic tape medium drives, or the like, but is not loaded into memory for processing by an information system. A loaded document is one that may be present in such a permanent storage system, but is then loaded into memory for processing by an information system, e.g., performing analysis to return results, such as generating an answer to a question in the case of a question and answer system, for example.

The mechanisms of the illustrative embodiments generate one or more representations of the dependencies of documents (e.g., authorship, document, and publication dependencies) and then analyzes these one or more representations to identify which of the documents should be included in a loaded set of documents and which documents are to remain unloaded. Curation recommendations may be of the type that certain documents that are currently unloaded should be loaded, other documents that are loaded should be unloaded (such as in the case where an update has occurred to the document or another document is determined to be more important or relevant or provides better information system analysis results), or the like.

As part of the analysis of the one or more representations of the dependencies of documents, the mechanisms of the illustrative embodiments may employ clustering and/or node splitting algorithms to cluster and/or split the document data for processing. For example, clusters of nodes in the one or more representations of dependencies may generated based on various attributes of the nodes to identify nodes having common or similar attributes, e.g., author, date, topic, publication, domain, categories, etc. Splitting the data allows document data to be associated with a plurality of nodes which may be processed in parallel threads of execution on the same or different processors.

The one or more representations of dependencies of documents comprise one or more hierarchical data structures, e.g., dependency tree data structures or the like. The one or more hierarchical data structures may comprise nodes representing documents, nodes representing authors, and optionally nodes representing publications. Edges, or links, between nodes represent the dependencies and may have associated weight values that indicate the strength of the dependencies or associations between the nodes. Various factors may contribute to the particular weight value associated with an edge/link as will be described in greater detail hereafter. The nodes may have attributes identifying the strength or importance of the nodes themselves. Various factors may contribute to the particular attributes of the node including, for example, the number of edges or links may be indicative of the relative importance of the node to the overall document collection, loaded documents of the document collection, or the like.

As mentioned above, the representation of dependencies of documents may comprise edges/links having associated weight values generated based on various factors. In some illustrative embodiments, these weight values may be affected by negative and positive natural language processing (NLP) document analysis to the document reference mapping. Negative NLP looks at references, in a document, to other documents, and the surrounding text, to determine if the references to the other documents have either a negative connotation, e.g., terms or phrases are indicative of a disparaging of the referenced document, a disagreement with conclusions of the referenced document, or the like, or a positive connotation, e.g., terms or phrases indicative of the correctness of results mentioned in the referenced document or the like. Various tools may be used to perform such negative/positive NLP without departing from the spirit and scope of the illustrative embodiments. For example, the WordNet text parsing tool may be used to perform such negative/positive NLP. Negative references to other documents may be used to reduce the weight value of an edge/link between the documents, i.e. affecting the weight value to indicate the relationship between the documents to be not as strong as it otherwise would be. Positive references to other documents may be used to increase the weight value of an edge/link between the documents, i.e. affecting the weight value to indicate the relationship between the documents to be more strong than it otherwise would be.

Other factors that may affect the weight values (or simply "weights") of the edges/links between documents may include the number of references within a document to the other document, the portion of the document in which the reference to another document is present, and the like. Analysis of the resulting graph representation of the electronic document collection may be used to identify the relative strengths/importance of the nodes in the graph representation, the relative fragility of the relationships between nodes, and the like.

The mechanisms of the illustrative embodiments essentially identify which documents in a document collection should be included in a set of loaded documents for operation on by an unstructured information management system and ultimately for use by an analysis mechanism such as may be present in a search engine, a question and answer system, or other analysis mechanism that analyzes electronic documents for purpose of generating results to achieve a desired purpose. In one illustrative embodiment, the mechanisms of the illustrative embodiment identify electronic documents to be loaded into memory and upon which the question and answer system operates to generate answers to questions posed by users of client computing devices.

The mechanisms of the illustrative embodiments may be employed as a pre-processor of these electronic documents for such a question and answer system or other analysis mechanism of an unstructured information management system. The mechanisms of the illustrative embodiments may pre-process a collection of electronic documents automatically without requiring manual evaluation or decision making with regard to which electronic documents are to be loaded and which are not. The pre-processing may be done periodically, continuously, or in response to a user request to perform such pre-processing or other detected event, e.g., an update to the document collection, or the like.

Thus, with the mechanisms of the illustrative embodiments, errors encountered by manual mechanisms for curating document collections are reduced since curation recommendations and actions are identified automatically based on a detailed analysis of dependencies between documents (e.g., authorship, document reference, and/or publication dependencies). Moreover, a relatively higher degree of accuracy is achieved with regard to confidence measures in the collected document data. These improvements lead to an improved unstructured information management system, such as question and answer system like Watson™ mentioned above.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
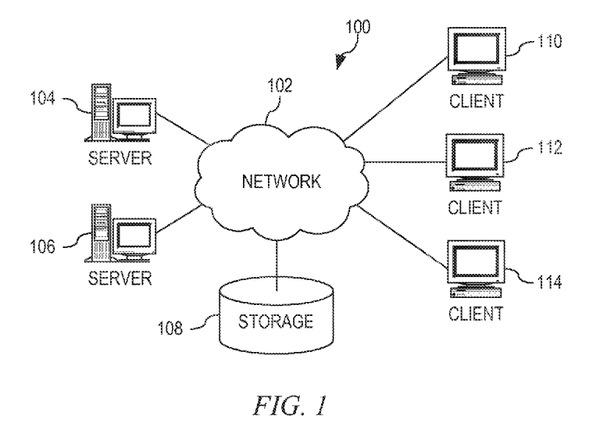
FIG. 1 is an example diagram of a distributed data processing system in which aspects of the illustrative embodiments may be implemented.
Figure 2:
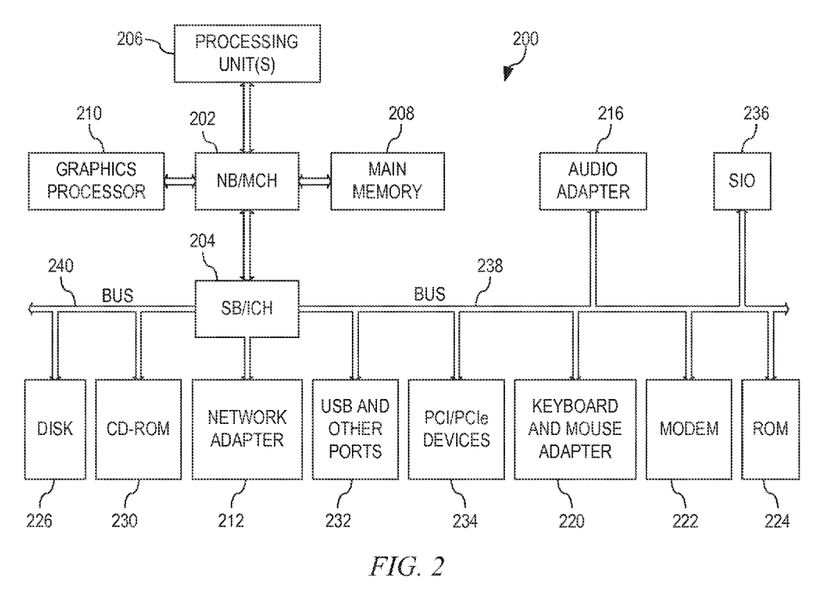
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Referring again to FIG. 1, in accordance with the illustrative embodiments, one or more of the computing devices/systems shown in FIG. 1 may store one or more electronic documents, document collections, or the like, that may be operated upon by an unstructured information management system, such as a search engine, database, question and answer system (e.g., Watson), or the like, as well as the mechanisms of the illustrative embodiments. These unstructured information management systems (or simply "information systems") may be implemented as software instructions loaded into, and executed by, one or more of the server computing devices 104, 106, client computing devices 110-114, or a combination of server and client computing devices. The mechanisms of the illustrative may be integrated with the information systems, or may be a separate system from the information systems.

For example, in one illustrative embodiment, server 104 may implement a question and answer system that may be accessed by client computing devices 110-114 for submitting question requests to the server 104 and having the question and answer system respond with answer responses based on its search and analysis of electronic document data stored in network attached storage 108, and/or other computing systems and their associated storage systems. The server 104 may further implement, as part of the question and answer system or as a separate element, the mechanisms of one or more of the illustrative embodiments described herein to further manage electronic document data collections utilized by the question and answer system when responding to question requests. Alternatively, the mechanisms of the illustrative embodiments may be implemented on a separate computing device from server 104, e.g., on server 106, and may operate independently of the information system hosted by the server 104, although the information system may make use of the results of the mechanisms of the illustrative embodiments.

As mentioned above, the mechanisms of the illustrative embodiments determine dependencies of electronic documents, such as authorship dependencies of documents, document references to one another, publication dependencies, and the like, for example. The illustrative embodiments map the dependency relationship and analyze the mapped documents' effects on the quality or accuracy of information system results returned, e.g., does including the document in the loaded documents for the information system increase or decrease the quality of the results returned, e.g., the answers to questions are more accurate than if the document is not included in the loaded documents. The effects may be evaluated based on the relative strength of the document and its relationships with other documents in the document collection, as may be identified by attributes associated with nodes and/or weight values associated with edges/links in a hierarchical representation of the dependencies.

Based on the determined effects of the document on the results generated by an information system, the mechanisms of the illustrative embodiments may make curation action recommendation for the electronic document and the information system, e.g., include the document in a set of loaded documents, remove the document from a set of loaded documents, add referenced documents to the set of loaded documents, add documents having a similar authorship or similar publication to the set of loaded documents, load other referenced documents instead of the current document, or the like. These recommendations may be communicated to a human administrator to assist the human administrator in managing the electronic document collections used by the information system, may be used to automatically implement the recommended curation action within the information system by modifying the electronic document collections utilized by the information system, or the like.

Figure 3:
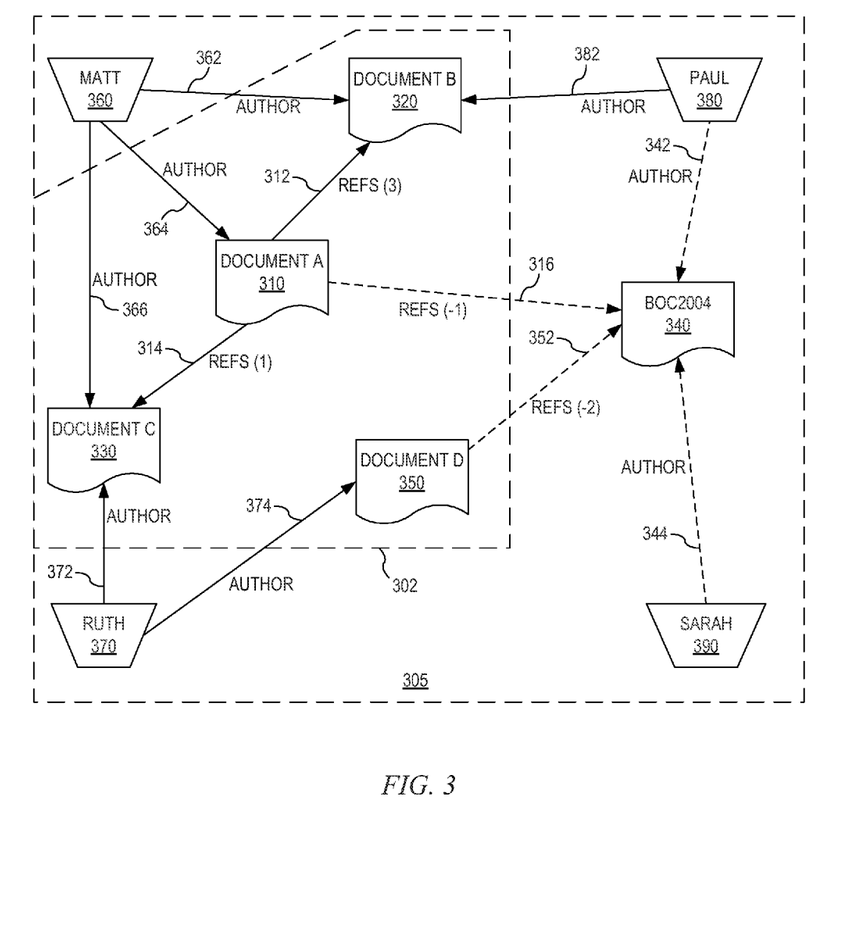
FIG. 3 is an example block diagram illustrating an example of a graph of documents and authors and their relationships, for a given scenario, as may be generated by the mechanisms of one example illustrative embodiment.

To better illustrate the improvements made by the mechanisms of the illustrative embodiments, consider a scenario as depicted in FIG. 3, in which an automated process, such as an ingestion process for an unstructured information management system, loads a document, referred to herein as "document A," which has an author, Matt Broomhall. In the context of the present description, an unstructured information system is any system that receives as input, unstructured content, parses and processes the unstructured content to extract information which can be maintained in a structured form for use by an analysis mechanism which may be integrated with the unstructured information management system or may be a separate entity that takes the results of the unstructured information management system as input. In the present description, an example of such an unstructured information management system being a question and answer system, such as Watson, will be used for illustrative purposes but the present invention is not limited to such and other types of unstructured information management systems and analysis mechanisms may be used without departing from the spirit and scope of the illustrative embodiments.

Referring again to FIG. 3, in response to loading document A, the unstructured document is parsed and processed to identify document dependencies, e.g., specific references to other documents in the content of document A, authorship dependencies between document A and other different documents having a same author, publication information that identifies a dependency between the publication and the document, and the like. Dependency information may be present within the content of the document itself, in metadata associated with the document, or both, e.g., authorship information may be present in the metadata of a document while specific references to other dependent documents may be present within the content of the document, such as in footnotes, endnotes, explicit statements within the content, bibliographic information in the document, cross-reference information, or the like. The mechanisms for actually identifying the dependency information in the documents and/or their metadata may make use of known algorithms, such as Google Scholar Citations, or may utilize style or pattern matching techniques that look at textual patterns or styles in the document content and/or metadata and matches them to pre-defined or well known styles or textual patterns, e.g., American Psychological Association (APA) styles, Medical information styles, Association for the Advancement of Artificial Intelligence (AAAI) styles, Association of Computing Machinery (ACM) styles, and the like.

As an example, the identification of document dependencies, in one illustrative embodiment, may involve extracting author information from document A both with regard to the author of document A as well as authors of other documents referenced by document A. For example, the extraction of author information from document A may involve parsing and analyzing tags in the document, header fields, known format fields, or the like, of the document and/or document metadata and retrieving the author information from these locations in the document data for document A. This extraction may include parsing and analyzing various portions of the document data for document A including bibliographic information, endnote information, footnote information, and other portions of the document that may include citations to other documents. As mentioned above, the identification of the portions of the document that contains such authorship and document dependency information may further be based on the identification, through parsing, of regular expressions that match pre-defined styles, such as APA, Medical, ACM, and AAAI styles of citations, for example.

In the example shown in FIG. 3, document A 310, authored by Matt Broomhall 360, during a pre-processing of documents for use with an unstructured information management system, is loaded into memory, analyzed, and determined to have document references, or dependencies, to three other documents, document B 320, document C 330, and BOC2004 340. Document A 310 has three references to document B 320 (which is part of a set of "loaded" documents indicating that the document is either currently loaded in memory or should be loaded into memory by the analysis mechanisms, e.g., question and answer system) and thus, the edge 312 between document A 310 and document B 320 (the edges representing the relationships or dependencies between documents) has a corresponding weight of "3." Document A 310 has a single reference to loaded document C 330 and thus, the weight of the edge 314 between document A 310 and document C 330 is "1." Document A 310 has another reference to document BOC2004 340, however this document is currently in the electronic document collection 302 utilized by the information system but is not included in the set of loaded documents 305, i.e. it is an "unloaded" document. As a result, while the weight of the edge 316 between document A 310 and document BOC2004 340 would normally be "1" due to the single reference, the weight of the edge 316 is set to a negative weight value since the document BOC2004 340 is not actually in the set of loaded documents 302 within the electronic document collection 305.

The electronic document collection 305 represents all of the electronic documents stored in permanent storage and encompasses both loaded 302 and unloaded documents. The set of "loaded" documents 302 referred to herein is a subset of the electronic document collection 305 and represents those documents that should be loaded into memory and operated on by an analysis mechanism when producing results, such as answers to submitted questions in a question and answer system. By the mechanisms of the illustrative embodiments, the set 302 may be identified, expanded to include additional documents, reduced to remove documents from the set 302, or the like, as described herein.

As shown in FIG. 3, in addition to representing the dependencies between documents as specified by references from one document to another, i.e. document dependencies, the representations of the dependencies may further include representing authorship dependencies between authors and documents. Thus, the hierarchical representation of dependencies includes nodes for both documents and authors and edges between nodes representing the relationships between these documents and between authors and documents. In addition, although not shown in FIG. 3, nodes may be associated with publication entities, journal entities, or the like, with edges representing a relationship between these publication entities, journal entities, etc. and the documents and/or authors.

Thus, as shown in FIG. 3, Document A 310 is authored by Matt Broomhall 360 represented by node 360 and the relationship represented by edge 364. Document B 320 is authored by Matt Broomhall 360 and Paul Bastide 380 as represented by nodes 360 and 380 and the relationships being represented by edges 362 and 382. Document C 330 is authored by Matt Broomhall 360 and Ruth Smith 370 as represented by nodes 360 and 370, and the relationships being represented by edges 366 and 372. Document BOC2004 340 is authored by Paul Bastide 380 and Sarah Jones 390 as represented by nodes 380 and 390 and the relationships being represented by edges 342 and 344.

In order to generate the representation of dependencies shown in FIG. 3, or other similar representations, it is assumed that the unstructured electronic documents in the electronic document collection 305 is performed or has been previously performed, such as in response to the electronic document being added to the electronic document collection 305. That is, the parsing, processing, and extracting of information from the electronic documents mentioned above is performed to identify authorship information, document references, publication references, and the like. This is done with regard to both electronic documents in the set of loaded documents and electronic documents that are not in the set of loaded documents. Thus, information regarding document references, authorship information, and publication references for unloaded documents are also known through these mechanisms and may be used to generate nodes and edges in the hierarchical representation of the dependencies of documents in the document collection 305.

That is, for example, when analyzing document A 310, the references to document B 320 and document C 330 may be identified and the associated authorship information retrieved from metadata associated with the electronic documents 320 and 330. In so doing, the authors 360, 370, and 380 may be identified. Since the authorship for all of the documents in the electronic document collection 305 are known from the analysis of these documents, links between these authors 360, 370, 380 and other documents in the electronic document collection 305 may be similarly identified and corresponding edges and nodes generated. This process may be repeated with each document in the electronic document collection 305 to generate one or more hierarchical representations of the electronic document collection 305 comprising nodes and edges for both loaded and unloaded documents, authors, publications, and the like.

Thus, for example, in analyzing document C 330, author 370 may be identified and another document, document D 350, in the electronic document collection 305 may be identified and analyzed in a similar manner to identify two references 352 from document D 350 to document BOC2004 340. Again, since document BOC2004 340 is not within the set of loaded documents in the electronic document collection 305, the weight of the edge 352 is set to a negative value, i.e. "−2" in this example since there are two references to an electronic document that is an unloaded document within the electronic document collection 305.

The mechanisms of the illustrative embodiments store the relationships between documents, between documents and their authors, and optionally between documents and/or authors and associated publications, in a hierarchical graph or dependency data structure. In such a hierarchical graph or dependency data structure, as illustrated graphically in FIG. 3, nodes of the graph or dependency data structure represent documents, authors, or publications. These nodes may have attributes representing the relative importance or "strength" of the document, author, or publication. Edges, or links, between nodes represent relationships or dependencies between the documents, authors, or publications and their associated documents. The edges may have associated weight values based on a number of different factors, such as a number of references, or dependencies, between one document and another.

Thus, in the depicted example, documents 310-350 and authors 360-390 would all be represented by separate nodes in the graph or dependency data structure. Edges between these nodes, i.e. edges 312-316, 342-344, 352, 362-366, 372-374, and 382 represent relationships or dependencies between documents and documents and their associated authors. The edges may be unidirectional as depicted or, if there are circular references, described hereafter, may be bi-directional. Weight values associated with the edges, in one illustrative embodiment, are determined based on the number of references from one document to another in the depicted example with negative values indicating edges to unloaded documents 302 within the electronic document collection 305.

The mechanisms of the illustrative embodiments may further apply custom metrics to the weight values on the edges between documents and between documents and their associated authors/publications, and/or even the strength attributes associated with the nodes based on the strength of content. These custom metrics operate to modify the weight values and strength attributes based on the specific conditions associated with the relationship or node. Thus, while a base weight value may be calculated based on the number of references from one document to another, a modified weight value may be generated based on this base value and the application of one or more of these custom metrics to the base weight value. Similarly, while a base strength or importance attribute of a node may be calculated based on, for example, the number of edges or links from that node to other nodes, this base strength or importance attribute may be modified by the application of one or more custom metrics to generate modified strength/importance attributes.

The logic provided in the mechanisms of the illustrative embodiments may include logic for determining the custom metrics to be applied to the edges/links, the nodes, etc., in the hierarchical graph or dependency data structure. This logic may analyze the various information extracted from the electronic documents, analyze the current status of the hierarchical representation of the electronic document collection 305 with regard to numbers of edges/links, weights on edges/links, etc., and determine a custom metric to be applied to a corresponding node or edge within the hierarchical representation.

For example, with regard to an author node, the publications with which an author is associated, i.e. the publications that the author's documents have been published in, may be identified and analyzed to determine if these publications are peer reviewed journals, credible publications, non-credible publications, or the like, and this information may be used to generate a custom metric, e.g., an author whose work has been published in a prestigious publication or is published in a peer-reviewed journal may have a higher custom metric applied to thereby increase the strength of that author's node in the hierarchical representation and/or the edges from that author's node to the author's document nodes in the representation. The same may be done for publications themselves, e.g., if a publication is in a prestigious publication or peer-reviewed journal, a higher custom metric may be applied to increase the strength/importance attribute of the corresponding node or increase the weights of the edges associated with that node. For example, if Author A has five documents published in American Psychology Today and another Author has one document published in People Magazine, Author A may have a higher custom metric applied since American Psychology Today is more prestigious within the psychology community than People Magazine.

Many different factors can be considered when generating these custom metrics as will become apparent to those of ordinary skill in the art in view of the present description. For example, the number of references to a document is indicative of the veracity of the document and thus, can be used to generate a custom metric for the node corresponding to the document and/or the edges from that node to other nodes, i.e. if a document is referenced often by other documents, then the references within that document are most likely more important and so the references from that document to other documents may be weighted higher.

As touched upon above, the veracity of a document may be determined from various attributes of the document and may be used to generate a custom metric to be applied to the document's strength/importance attributes and/or the weights of edges/links associated with that node. The veracity of a document, e.g., whether the document is "true" or "false" where "true" means that the content of the document can be relied upon to be accurate and correct and "false" meaning that the document cannot be relied upon to be accurate and correct, may be determined from a number of different factors including the publication(s) in which the document appears, the other documents referencing the document and their veracity, the manner by which the document was acquired into the document collection 305, e.g., the source of the document, and the like.

The custom metric may be based on an age of the document being referenced such that references to documents that are relatively old have a custom metric that operates to reduce the weight of the corresponding edge or the strength/importance attribute of the document's node, since the referenced document is more likely to be out-of-date. The relative determination of "old" as opposed to "new" may be made by setting a threshold value, e.g., 5 years, where documents older than the threshold value (in relation to the current time) may be considered "old" and documents younger than the threshold value are considered "new."

Alternatively, the ages of documents having a common author may be compared to each other to determine which are relatively "old" and which are "new" so as to determine which documents may be included in the set of loaded documents and which should be left as unloaded. This may be especially useful when first performing clustering on documents in the electronic document collection 305 where documents having a similar subject matter, authorship, or the like, are clustered together and then the mechanisms of the illustrative embodiments are applied to determine weightings of edges between documents. In other words, documents may be clustered based on authorship such that a cluster is generated for a particular author, for example. Within that cluster, documents that have a relatively older age may be eliminated from the set of loaded documents while newer documents are included in the set of loaded documents, with old and new being determined by comparing the age of the documents relative to a threshold value, e.g., documents older than 5 years are "old" and others are "new". The same can be done for other types of clustering such as clustering based on publication, topic, domain, category of subject matter, or the like. Of course, the determination as to what documents from a cluster to include in the set of loaded documents and what ones not to include may be more complex and may take into account many different factors.

The custom metric may further be modified according to the relative impact of the document reference within a document to the other portions or sections of the document, e.g., the section, paragraph, or document as a whole. That is, a first document may reference a second documents that really has no bearing or real relevance to the subject matter of the first reference, e.g., a quote to The Illiad in a document whose subject is artificial intelligence in computer networks is not a relevant document reference. In such a case, the custom metric may be set to adjust the weight of the edge between the first document and the second document to indicate that the referenced document should not be included in the loaded documents, e.g., set to a negative value.

The custom metric may further be based on other sources of information about the authors and documents outside the document collection 305 and the results of the information extraction from these documents. For example, a separate database of authors, such as biographies of authors, bibliographic information about authors, employment information for authors, and the like, may be used as an external source to evaluate the importance of an author, e.g., as an expert in a particular field, as a prolific author, or the like. This information may be used again to modify the custom metric to give greater strength/importance attributes to authors having relatively better credentials and giving larger weights to edges/links between these authors and related documents.

The custom metrics may also be calculated based on comparisons of quantifiable values identified from analysis of the hierarchical graph or dependency data structure to one or more pre-established thresholds. For example, a threshold may be established that if a document has more than X number of edges/links to other documents, then the strength/importance attribute of the document node is increased by a determined custom metric or is reduced by a predetermined custom metric if it has less than X number of edges/links. If a document has more than Y number of authors, then it may be given a greater strength/importance and its edges/links a greater weight. If a document has more than X number of edges/links pointing to it, then it may be given a custom metric that increases its strength/importance attribute and weights of edges associated with it. Any quantifiable attribute of the node and edges, or combination of quantifiable attributes, in the hierarchical graph or dependency data structure may have an associated threshold against which it can be compared to generate a custom metric to be applied to attributes of the node/edge.

Furthermore, a custom metric may be calculated based on positive/negative natural language processing (NLP) of the document references in a document. That is, negative references in the document may be used to modify the weight value of a link to the referenced document to reduce the weight value. Positive references in the document to another document may operate to increase the weight value of the edge/link to the referenced document. Thus, custom metrics for increasing/decreasing such weight values may be generated to achieve such modifications of the weight values.

It should be noted that while certain factors for determining a custom metric to be applied to the strength/importance attributes of the nodes and weights of the edges/links are described above, the illustrative embodiments are not limited to such. There are a plethora of other factors that may be considered when determining a custom metric to be applied that may be used in addition to, or in replacement of, those discussed above. Moreover, any combination of such factors may be used without departing from the spirit and scope of the illustrative embodiments. In short, the illustrative embodiments utilize strength and/or veracity information to modify the strength/importance attributes and weights of edges/links representing relationships so as to increase/decrease the likelihood that the related nodes will result in corresponding documents being included in a set of loaded documents within the document collection 305.

The custom metric(s) may be applied to the attributes of the nodes and/or the weights of the edges to generate an updated or modified representation of the dependencies, e.g., authorship, document, and/or publication dependencies. In this way, a hierarchical graph or dependency data structure is generated which can be further analyzed to determine what documents in the hierarchical graph should be included in a set of loaded documents and which may be kept unloaded.

Having generated the graph or dependency data structure using the mechanisms described above, the illustrative embodiments analyze the dependency relationships within the graph or dependency data structure to determine the effect of a subject document, e.g., document A 310, on the electronic document collection 305 and the information system(s) utilizing the electronic document collection 305. Based on the determined effect of the subject document, a recommendation as to whether the subject document should be included in the set of loaded documents or not can be made and, in some illustrative embodiments, automatically implemented.

The effect of a subject document may be measured in a number of different ways. For example, initially it can be determined that nodes having strength/importance attributes less than a threshold value will not have a significant effect on the set of loaded documents. Similarly, edges or links having weight values that are not equal to or more than a threshold value may be considered to have little effect on the set of loaded documents.

Moreover, a reach or max-flow analysis may be performed on the graph representation to determine the reachability of nodes from a designated root or source node. That is, if the removal of a subject document, and thus its corresponding node, from the graph representation would result in other nodes being unreachable, then the effect of the subject document is relatively high. If a node's removal would not cause such a situation, then the node has a relatively lower effect on the overall set of loaded documents. Such reach or max-flow analysis may further identify the boundary of the effect of a document by identifying the maximum dependency reached from a root or source node, thereby indicating the effect of the removal of the subject node from the graph, since a greater reach indicates a larger number of nodes affected should the subject node be removed.

Any combination of one or more of these types of analysis for determining the effect of a document node on the graph representation may also be used. Of course other analysis may be used without departing from the spirit and scope of the illustrative embodiments.

As part of this analysis, the mechanisms of the illustrative embodiments may identify circular references present within the graph or dependency data structure. Cross-references are references that have parallel or related authorship. A circular reference is a reference where a document cites another document which cites the author in any direct or indirect manner, e.g., author Matt writes document A that references document B and author Paul writes document B that references document A.

Circular reference analysis may be performed, for example, with only the subject document whose impact is being analyzed, e.g., document A 310, or may be done with regard to all or a designated portion of the documents in the document collection 305. A graph searching algorithm may be used to determine if a circular reference is present with regard to the loaded document A 310 by identifying documents that reference each other. Such circular references within the graph may be broken by removing one of the documents in the circular reference from the set of loaded documents in order to avoid any negative effects such circular references may have on results generated by the analysis mechanisms of the unstructured information management system. The one to be removed from the set of loaded documents may be selected based on a measure of the impact of the removal of the documents with regard to other documents in the set of loaded documents.

As an example of the analysis of the graph representation that may be implemented in one or more of the illustrative embodiments, the mechanisms of the illustrative embodiments may first determine a root of the graph representation, e.g., a highest referenced document, i.e. the document having the most references to and/or from the document, in the graph representation. This may be done using topological sorting of the nodes in the graph representation to identify sparse and dense nodes where a sparse node is one that has relatively few edges and a dense node is one having a relatively large number of edges with a threshold value indicating the border of sparse versus dense nodes. In one illustrative embodiment, sparse and dense are determined based on an indegree of the node, i.e., a number of inward directed graph edges from a given graph vertex in a graph representation.

In one illustrative embodiment, a max-flow algorithm may be employed, such as the Bellman Ford max-flow algorithm, to traverse the graph representation along paths having nodes designated to be in the set of loaded documents to get from a root or source node to a designated sink node. If the algorithm cannot reach the sink node from the root/source node, then it is determined that additional nodes should be included in the set of loaded documents so that a path to the sink node is made available. Accordingly, nodes that are associated with unloaded documents may be flagged for inclusion in the set of loaded documents.

The system may employ one of many algorithms, such as the k-means, nearest-neighbor, dense-k subgraphs, max-flow, min-cut, search, to find various elements in the hierarchical graph or dependency data structure. These elements may include reference loops or circular references, categories, dense nodes, sparse nodes, reachability of nodes, range from a source node to a sink node, connectivity of nodes, and many other types of elements present in a hierarchical graph representation or dependency data structure. The particular algorithms employed depends on the desired results to be achieved, however in general the goal of the analysis of such algorithms is to identify dense areas in the hierarchical graph representation or dependency data structure and determine how to delve into these areas, such as by determining if they are dense and well connected, dense and poorly connected, or the like.

In addition to the above, the system may utilized a dead link algorithm in order to find edges/links to nodes that are not valid. These dead links may optionally be assumed to be invalid or "false" sources. Such dead links may exist, for example, if the graph representation has nodes added for documents referenced by another document in the document collection, but the referenced document is not yet in the document collection, for example. In such a case, a pseudo-node is generated and included in the graph representation and may or may not have an edge associated with it. If it has an edge associated with it, the weight may be set to a value indicative that the corresponding document is not to be included in the set of loaded documents. This weight may be later modified to a more valuable weight once the document is added to the document collection and determined to be valuable to include in the set of loaded documents.

As mentioned previously, as part of the analysis performed on the graph representation, clustering and splitting may be performed. With clustering, the mechanisms of the illustrative embodiments may group documents into like domains or categories based on attributes of the nodes, e.g., authorship, publication, topic of the content of a document, keywords associated with the document, edges/links between nodes, etc. As a result, nodes having similar attributes may be clustered into a group indicating a group of documents that are most likely to candidates for inclusion in a set of loaded documents and from which a selection of documents to be included in the set of loaded documents may be made. That is, such clustering may improve performance and focus the loading of domains and categories of documents, where a domain is a broader scope category.

Through the analysis performed on the graph or dependency data structure, the mechanisms of the illustrative embodiments may generate curation recommendations for improving the electronic document collection 305 and the operation of the information system. For example, if, during the analysis of the graph or dependency data structure, it is determined that additional nodes need to be added to the set of loaded documents to ensure that certain nodes are reachable, then such a recommendation may be generated by the system. Similarly, if the analysis identifies nodes that should be removed from the set of loaded documents, then such a recommendation may be generated by the illustrative embodiments. These recommendations may be generated and corresponding notifications sent to a system administrator or other authorized user. Alternatively, modifications may be made to the set of loaded documents to implement the recommendations automatically. Loaded documents may be specified by the setting of a corresponding attribute in association with the metadata of a document to indicate that the document is to be loaded for analysis by an analysis mechanism of an unstructured information management system, e.g., a question and answer system, search engine, or the like.

If the mechanisms of the illustrative embodiment identify circular references with regard to the loaded document A 310, the illustrative embodiments may recommend review and removing the weakest of the references, e.g., the reference having the lowest strength/importance attribute. If the mechanisms of the illustrative embodiment identify sparse nodes, the illustrative embodiments may recommend adding related author-document pairs to the electronic document collection 305 corresponding to these sparse nodes.

The illustrative embodiments may generate recommended curation actions based on assumptions that a document or reference is assumed to be false. For example, if a document is a parent to many dependent documents, i.e. has references to many other documents, and if it is assumed to be "false" or unreliable, then any documents referenced by the "false" parent document would have a degree of falsehood to it as well. A fragility index may be generated in this case based on an assumption that any well connected document or reference is false and determining the fragility of the set of loaded documents should that well connected document be removed from the set of loaded documents. The fragility index may be calculated, for example, as the inverse of the strength/importance attribute of the node or the inverse of the weight value of the edge/link.

The recommended curation actions may be communicated to a human administrator by sending a notification communication to an administrator workstation, client computing device, or the like. The notification may provide information regarding the cross-references, circular references, and/or sparse elements found during the analysis of the graph or dependency data structure along with the corresponding curation action that is recommended. The human administrator may then use the information in this notification to perform curation operations to improve the electronic document collection 305 and performance of the information system.

Alternatively, the recommended curation actions may be sent to the information system automatically so that the information system may automatically modify the electronic document collection 305 to implement the recommended curation actions. Of course a combination of manual and automated curation actions can also be used without departing from the spirit and scope of the illustrative embodiments.

Thus, the illustrative embodiments provide mechanisms for generating a representation of the dependencies between authors, documents, and optionally publications, which can then be used to identify the documents that should be included in a set of loaded documents. Analysis of this hierarchical representation may be performed based on a number of factors including the strength/importance attributes associated with nodes of the hierarchical representation and weight values associated with edges/links between nodes, to determine curation recommendations. Such curation recommendations are generally to either add or remove documents from the set of loaded documents. These recommendations may be sent to an authorized user and/or automatically implemented. These operations may be performed, for example, as a pre-processing operation for generating a set of loaded documents that can be operated upon by an analysis mechanism of an unstructured information management system.

It should be appreciated that while the above embodiments are described with regard to various thresholds being used to both determine custom metrics and to determine which electronic documents are to be kept or removed from the loaded documents. It should be appreciated that multiple thresholds may be used both for determining custom metrics and for determining which electronic documents are to be kept or removed from the loaded documents. For example, in one or more illustrative embodiments, thresholds may be established for determining a number of electronic documents of various strengths are to be included in the loaded documents. For example, percentage based thresholds may be established for specifying that the collection of loaded documents should include a first threshold percentage of electronic documents above a predetermined strength/importance metric, a second threshold percentage may be used to specify a maximum number of electronic documents having a strength/importance metric below a particular threshold strength/importance metric, and the like. Similarly, ranges of strength/importance metrics may be set to identify the ranges of strength/importance metrics of documents to include in the collection of loaded documents and ranges of strength/importance metrics of documents to remove from the collection of loaded documents. Any single threshold or combination of thresholds, including absolute values, ranges, percentages, and the like, may be used to generate custom metrics and/or also to make determinations as to whether particular electronic documents are to be included in the collection of loaded documents.

Figure 4:
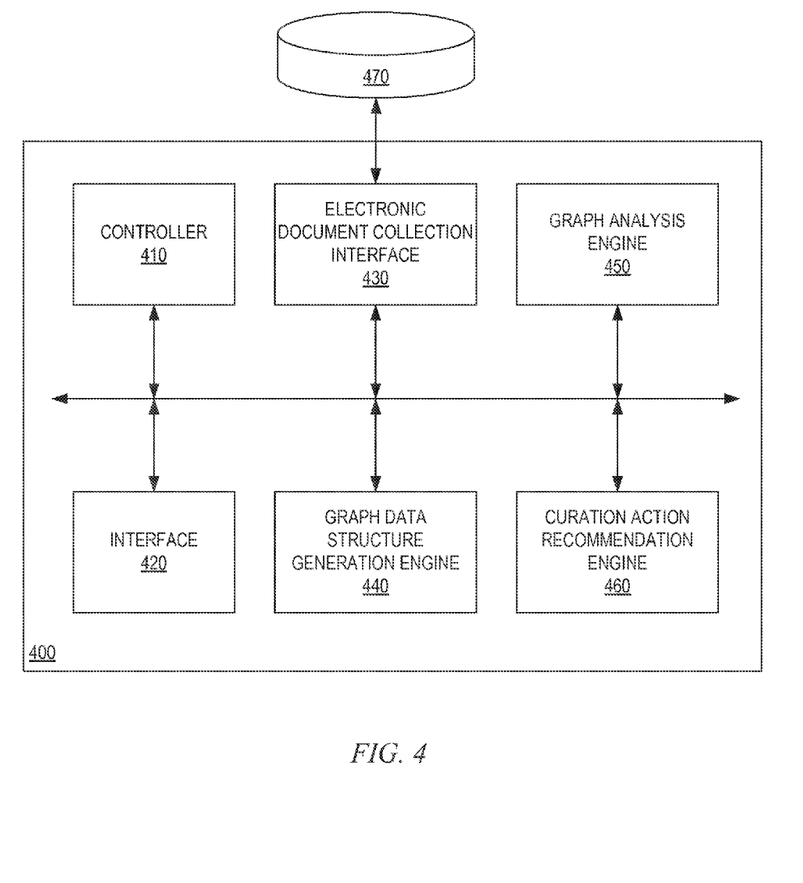
FIG. 4 is an example block diagram of the primary operational elements of one illustrative embodiment of the present invention.

FIG. 4 is an example block diagram of the primary operational elements of one illustrative embodiment of the present invention. The elements shown in FIG. 4 may be implemented in software, hardware, or any combination of software and hardware. In one illustrative embodiment, some of the elements of FIG. 4 may be implemented as software instructions loaded into one or more memories and executed by one or more processors of one or more data processing systems. Other elements shown in FIG. 4 may be implemented entirely within hardware, such as in the case of application specific integrated circuits (ASICs), field programmable gate arrays (FPGAs), communication interface logic, or the like. Any combination of software and hardware for implementing the operations of the illustrative embodiments is intended to be within the spirit and scope of the present invention.

As shown in FIG. 4, the curation recommendation engine 400 may include a controller 410, a communication interface 420, an electronic document collection interface 430, a graph data structure generation engine 440, a graph analysis engine 450, and a curation action recommendation engine 460. The controller 410 provides logic to control the overall operation of the curation recommendation engine 400 and orchestrates the operation of the other elements 420-460.

The communication interface 420 provides logic for sending and receiving communications over one or more data networks with other computing devices and storage systems. The electronic document collection interface 430 provides a communication interface through which the curation recommendation engine 400 may retrieve electronic document collection information from one or more backend storage systems 470, such as electronic document information for electronic documents referenced by a subject electronic document, e.g., document A 310 in FIG. 3. In addition, a search of the electronic document collection may be performed via this interface 430 and if a matching electronic document is not found in the electronic document collection, then this information may be used as well to generate a dependency graph or data structure for the loaded document indicating certain referenced electronic documents are not within the electronic document collection, e.g., adjusting weights to edges accordingly and the like.

As mentioned above, in one illustrative embodiment, the mechanisms of the illustrative embodiments operate on electronic documents. These electronic documents may be of different formats including Latex, PDF, ODF, Microsoft Office™ formats, and the like. The illustrative embodiments may be implemented with any style of citation of documents, such as APA, Medical, AAAI, ACM, and the like.

The graph data structure generation engine 440 generates a hierarchical graph representation or dependency data structure for a loaded document, e.g., document A 310 in FIG. 3, identified or received via the communication interface 420 based on an identification of references to other documents and authors in the loaded document, such as described previously. The generation of the graph or dependency data structure involves generating nodes for representing authors and electronic documents, and possibly publications, and edges between nodes representing the relationships between the nodes, e.g., relationships between documents and relationships between authors and the related documents. In addition, the generation of the graph or dependency data structure further involves weighting the edges based on the number of references to the electronic documents, whether the referenced electronic documents are in the electronic document collection, as well as any other custom metrics that may be applied, as previously described above.

The resulting graph or dependency data structure is provided to the graph analysis engine 450 which analyzes the graph or dependency data structure to identify circular references, sparse nodes in the graph, and the like. The results of this analysis are provided to the curation action recommendation engine 460 which generates a recommendation notification to be sent to either a human administrator via a computing device or to an automated information system to implement the recommended curation action if appropriate. As mentioned above, these recommendations may include removal of weaker documents, addition of documents to the electronic document collection, or the like. The recommendation notifications may be transmitted to the automated system or human administrator's computing device via the communication interface 420.

Figure 5:
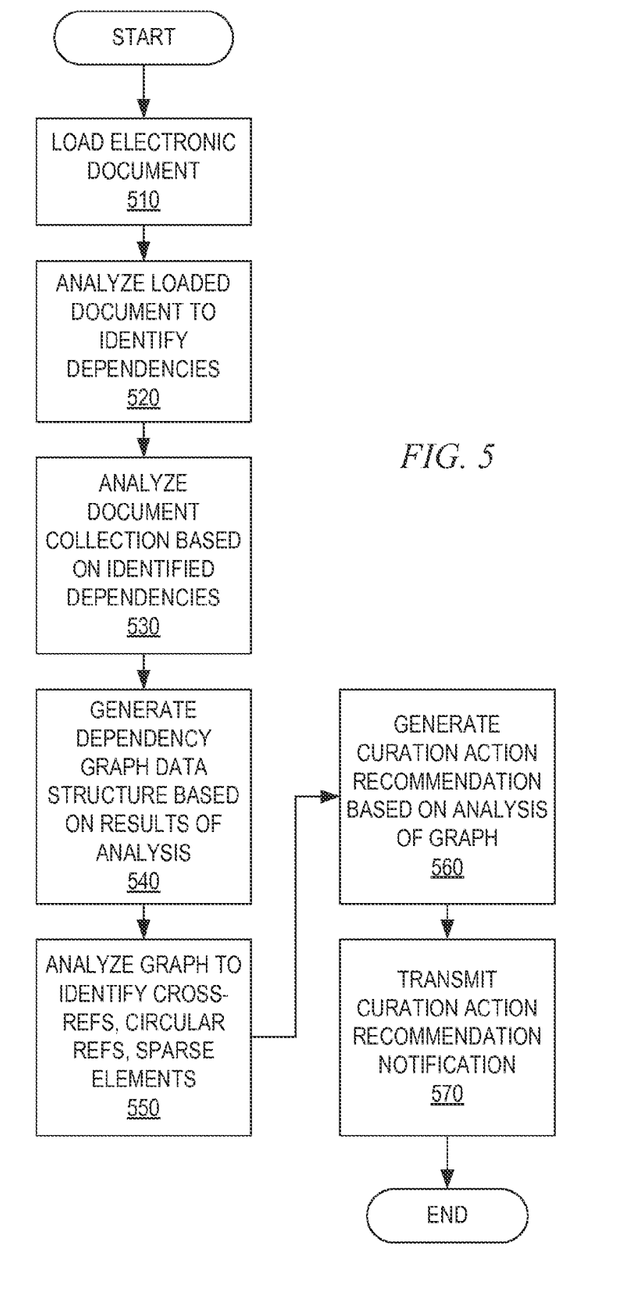
FIG. 5 is a flowchart outlining an example operation for performing document curation in accordance with one illustrative embodiment.

FIG. 5 is a flowchart outlining an example operation for performing document curation in accordance with one illustrative embodiment. The operation outlined in FIG. 5 may be implemented, for example, by a curation recommendation engine 400 in FIG. 4 executing on one or more computing systems, such as server 104, 106 in FIG. 1.

As shown in FIG. 5, the operation starts by loading an electronic document for analysis (step 510). This loading of the electronic document may be performed by an automated process, such as a native language processing ingestion process of an Unstructured Information Management Application (UIMA) stream, other types of information management processes, or the like. The loaded electronic document is scanned and analyzed to identify document dependencies both with regard to authorship and references to other documents (step 520). Analysis of an electronic document collection is performed based on the identified document dependencies and recursive analysis of dependencies of the dependent documents (step 530). A dependency graph data structure is generated based on the results of the analysis of the document dependencies (step 540). The dependency graph data structure is analyzed to identify cross-references, circular references, and sparse elements of the dependency graph data structure (step 550). Based on the analysis of the dependency graph data structure, curation action recommendations are determined (step 560) and curation action recommendation notifications are generated and transmitted (step 570). The operation then terminates.

Thus, the illustrative embodiments provide mechanisms for improving the quality of electronic document collections and providing curation action recommendations based on an analysis of the electronic document and its authorship and document dependencies. The illustrative embodiments may implement curation action recommendations either manually or automatically to improve the use of the electronic document collection by information systems, such as a search engine, database, question and answer system, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing an electronic document collection, comprising:

analyzing a first electronic document to identify a reference to a second electronic document;

analyzing the second electronic document to identify document dependencies with zero or more other electronic documents;

generating a dependency information data structure based on the analysis of the first electronic document and the analysis of the second electronic document, wherein the dependency information data structure comprises a dependency graph data structure of the electronic document collection, the dependency graph data structure comprising first nodes representing electronic documents in the electronic document collection, second nodes representing authors of electronic documents in the electronic document collection, and edges between nodes representing relationships between nodes, wherein each of the first nodes and the second nodes have an associated node strength attribute, and wherein the associated node strength attribute is a measure of a relative importance of the associated first node or the associated second node to the dependency graph data structure of the electronic document collection and a fragility of the dependency graph data structure with regard to the associated first node or the associated second node;

analyzing the dependency information data structure to identify a loaded document subset of the electronic document collection that is a subset of electronic documents to be loaded into memory when performing an information analysis operation;

generating an electronic document curation action recommendation based on the identified subset of the electronic document collection; and outputting the electronic document curation action recommendation.

2. The method of claim 1, further comprising:

analyzing the first electronic document to identify an author of the first electronic document; and identifying one or more other electronic documents having a same author as the author of the first electronic document, wherein generating the dependency information data structure is further based on the identification of the author of the first electronic document and the identification of the one or more other electronic documents having the same author.

3. The method of claim 1, wherein the node strength attribute of the associated first node or second node in one of the first nodes or the second nodes is calculated based on a number of edges associated with the associated first node or the associated second node.

4. The method of claim 1, wherein the node strength attribute of the associated first node or the associated second node in one of the first nodes or the second nodes is calculated based on at least one of an evaluation of an associated author's authority or a veracity of a document associated with the associated first node or the associated second node.

5. The method of claim 4, wherein the node strength attribute of the associated first node or the associated second node is based on the evaluation of the associated author's authority, and wherein the evaluation of the associated author's authority comprises at least an evaluation of credibility of one or more publications in which the author has published documents and a number of documents published in each of the one or more publications.

6. The method of claim 1, wherein the edges between nodes have associated weight values, and wherein the weight value of an edge is indicative of a strength of a corresponding relationship between nodes associated with the edge.

7. The method of claim 6, wherein the weight value of an edge comprises a base weight value that is calculated based on a number of references from a source document to a referenced document associated with the edge.

8. The method of claim 7, wherein the weight value of the edge is further based on a custom metric applied to the base weight value, and wherein the custom metric is determined based on at least one of a number of edges associated with at least one of a source node or a referenced node associated with the edge, a veracity measure of at least one of the source node or the referenced node associated with the edge, an age of a document associated with at least one of the source node or the referenced node, a determined relative impact of a document associated with at least one of the source node or the referenced node, or positive and negative natural language processing of a document reference in a document associated with the source node.

9. The method of claim 1, wherein the electronic document curation action recommendation comprises at least one of adding an electronic document to the loaded document subset or removing an electronic document from the loaded-document subset.

10. The method of claim 1, wherein the information analysis operation is a question and answer determination operation of a question and answer system in response to the submission of a question by a client computing device.

11. A computer program product comprising a non-transitory computer readable storage medium having a computer readable program stored therein, wherein the computer readable program, when executed on a computing device, causes the computing device to:

analyze a first electronic document to identify a reference to a second electronic document;

analyze the second electronic document to identify document dependencies with zero or more other electronic documents;

generate a dependency information data structure based on the analysis of the first electronic document and the analysis of the second electronic document, wherein the dependent information data structure comprises a dependency graph data structure of the electronic document collection, the dependency graph data structure comprising first nodes representing electronic documents in the electronic document collection, second nodes representing authors of electronic documents in the electronic document collection, and edges between nodes representing relationships between nodes, wherein each of the first nodes and the second nodes have an associated node strength attribute, and wherein the associated node strength attribute is a measure of a relative importance of the associated first node or the associated second node to the dependency graph data structure of the electronic document collection and a fragility of the dependency graph data structure with regard to the associated first node or the associated second node;

analyze the dependency information data structure to identify a loaded document subset of the electronic document collection that is a subset of electronic documents to be loaded into memory when performing an information analysis operation;

generate an electronic document curation action recommendation based on the identified subset of the electronic document collection; and output the electronic document curation action recommendation.

12. The computer program product of claim 11, wherein the computer readable program further causes the computing device to:

analyze the first electronic document to identify an author of the first electronic document; and identify one or more other electronic documents having a same author as the author of the first electronic document, wherein generating the dependency information data structure is further based on the identification of the author of the first electronic document and the identification of the one or more other electronic documents having the same author.

13. The computer program product of claim 11, wherein the node strength attribute of the associated first node or second node in one of the first nodes or the second nodes is calculated based on a number of edges associated with the associated first node or the associated second node.

14. The computer program product of claim 11, wherein the node strength attribute of the associated first node or the associated second node in one of the first nodes or the second nodes is calculated based on at least one of an evaluation of an associated author's authority or a veracity of a document associated with the associated first node or the associated second node.

15. The computer program product of claim 14, wherein the node strength attribute of the associated first node or the associated second node is based on the evaluation of the associated author's authority, and wherein the evaluation of the associated author's authority comprises at least an evaluation of credibility of one or more publications in which the author has published documents and a number of documents published in each of the one or more publications.

16. The computer program product of claim 11, wherein the edges between nodes have associated weight values, and wherein the weight value of an edge is indicative of a strength of a corresponding relationship between nodes associated with the edge.

17. The computer program product of claim 16, wherein the weight value of an edge comprises a base weight value that is calculated based on a number of references from a source document to a referenced document associated with the edge.

18. The computer program product of claim 17, wherein the weight value of the edge is further based on a custom metric applied to the base weight value, and wherein the custom metric is determined based on at least one of a number of edges associated with at least one of a source node or a referenced node associated with the edge, a veracity measure of at least one of the source node or the referenced node associated with the edge, an age of a document associated with at least one of the source node or the referenced node, a determined relative impact of a document associated with at least one of the source node or the referenced node, or positive and negative natural language processing of a document reference in a document associated with the source node.

19. The computer program product of claim 11, wherein the electronic document aeration action recommendation comprises at least one of adding an electronic document to the loaded document subset or removing an electronic document from the loaded document subset.

20. The computer program product of claim 11, wherein the information analysis operation is a question and answer determination operation of a question and answer system in response to the submission of a question by a client computing device.

21. An apparatus, comprising:
a processor; and
a memory coupled to the processor, wherein the memory comprises instructions which, when executed by the processor, cause the processor to:
analyze a first electronic document to identify a reference to a second electronic document;
analyze the second electronic document to identify document dependencies with zero or more other electronic documents;
generate a dependency information data structure based on the analysis of the first electronic document and the analysis of the second electronic document, wherein the dependency information data structure comprises a dependency graph data structure of the electronic document collection, the dependency graph data structure comprising first nodes representing electronic documents in the electronic document collection, second nodes representing authors of electronic documents in the electronic document collection and edges between nodes representing relationships between nodes, wherein each of the first nodes and the second nodes have an associated node strength attribute, and wherein the associated node strength attribute is a measure of a relative importance of the associated first node or the associated second node to the dependency graph data structure of the electronic document collection and a fragility of the dependency graph data structure with regard to the associated first node or the associated second node;
analyze the dependency information data structure to identify a loaded document subset of the electronic document collection that is a subset of electronic documents to be loaded into memory when performing an information analysis operation;
generate an electronic document curation action recommendation based on the identified subset of the electronic document collection; and
output the electronic document curation action recommendation.

* * * * *